United States Patent [19]

Greenfield et al.

[11] 3,855,079

[45] Dec. 17, 1974

[54] PROCESS AND APPARATUS FOR RECOVERING RESIDUAL OIL FROM SOLIDS DEHYDRATED IN AN OIL MEDIUM AND GROSSLY DEOILED

[75] Inventors: Charles Greenfield, Murray Hill; Robert E. Casparian, Boonton; Anthony J. Bonanno, Parsippany, all of N.J.

[73] Assignee: Hanover Research Corporation, Hanover, N.J.

[22] Filed: Dec. 26, 1972

[21] Appl. No.: 318,424

[52] U.S. Cl............ 203/47, 159/1 RW, 159/13 A, 159/17 R, 159/47 R, 159/49, 159/DIG. 17, 159/DIG. 25, 202/174
[51] Int. Cl...... B01d 21/00, B01d 1/22, B01d 1/26, B01d 1/00, F26b 7/00
[58] Field of Search......... 203/10, 47, 43; 159/16 S, 159/1 RW, 13 A, 47, 17 R, 49, DIG. 17, DIG. 25; 202/174

[56] References Cited
UNITED STATES PATENTS

| | | | |
|---|---|---|---|
| R26,317 | 12/1967 | Greenfield | 159/17 R |
| R26,352 | 2/1968 | Greenfield | 159/13 A |
| 1,997,980 | 4/1935 | Smith | 23/177 |
| 2,151,079 | 3/1939 | Bowen | 210/2 |
| 3,304,991 | 2/1967 | Greenfield | 159/13 A |
| 3,323,575 | 6/1967 | Greenfield | 159/13 A |
| 3,716,458 | 2/1973 | Greenfield et al. | 159/13 R X |

Primary Examiner—Jack Sofer
Attorney, Agent, or Firm—Richard L. Cannaday

[57] ABSTRACT

Process and apparatus for recovering residual oil from solids previously substantially dehydrated by a process wherein a slurry of water-wet solids in oil is subjected to a heat evaporation step to substantially remove the water. The oil is then largely expressed from the solids after which the solids still containing some oil as residual oil are extracted with a relatively low viscosity and relatively volatile water-immiscible light oil. The light oil-laden solids are then brought into direct contact with steam whereby the presence of the steam effectively reduces the boiling point of the water-immiscible light oil to effect its more efficient removal from the solids. Excess steam and light oil vapor are used to supply heat to the overall process.

7 Claims, 4 Drawing Figures

PROCESS AND APPARATUS FOR RECOVERING RESIDUAL OIL FROM SOLIDS DEHYDRATED IN AN OIL MEDIUM AND GROSSLY DEOILED

BACKGROUND OF THE INVENTION

The economic disposal of waste solids and recovery of clean water from aqueous solutions and dispersions thereof is a recognized problem. Also, the need to recover clean water and valuable solid materials from aqueous solutions and dispersions thereof is a common occurrence. Ideally, apparatuses and processes for the recovery of water from aqueous solids should provide ease of disposition of all waste constituents, avoidance of pollution, economic operation and hygienic handling, and should, in addition, yield clean water. Furthermore, in the course of recovering clean water it is desirable to obtain valuable solid products and by-products, both solid and liquid, which are either valuable in themselves or can be utilized to further the economies of the process. For purposes of this invention it is to be understood that the term "aqueous solids" is employed generically to include suspensions, dispersions, solutions and mixtures and other forms of fluid association of solids in water.

In our co-pending U.S. application Ser. No. 73,336 filed Sept. 18, 1970, and now U.S. Pat. No. 3,716,458 titled "Process and Apparatus for Recovering Clean Water from Dilute Solutions of Waste Solids," are disclosed process and apparatus whereby dilute aqueous waste solids are concentrated by heat evaporation, and the resultant concentrated aqueous waste solids are admixed with a relatively non-volatile oil to form a mixture which is dehydrated by heat evaporation. The substantially anhydrous waste solids in oil slurry thus formed is thereafter separated into the oil phase and the waste solids phase. However, the waste solids have sorbed thereon appreciable amounts of oil which, if not recovered, will be lost to the process and contribute to unfavorable economics.

SUMMARY OF THE INVENTION

The process and apparatus of this invention comprise a series of steps and a systematic arrangement of equipment for recovering residual oil from solids dehydrated in an oil medium. Aqueous solids are slurried with a relatively non-volatile oil and the mixture substantially dehydrated by heat evaporation. The water vapor is condensed to yield clean water and the resultant slurry of substantially anhydrous solids in oil is separated into the oil phase and the solids phase which is laden with residual oil. The process and apparatus of the instant invention provide for economical removal of the residual oil from the dry solids.

It is therefore an object of this invention to provide process and apparatus for the recovery of residual oil from aqueous solids dehydrated in an oil medium.

It is another object of this invention to obtain solids from a dehydration in oil process that are not only dehydrated but which are deoiled beyond the point usually attainable by mechanical means.

These and other objects of the instant invention will become apparent to those skilled in the art from the following description and claims considered in connection with the accompanying drawings.

The foregoing objects are accomplished by the practice of this invention. Broadly, viewed in one of its principal aspects, this invention consists of a process for the recovery of residual oil from solids dehydrated in an oil medium and grossly deoiled comprising the steps:

1. Admixing aqueous solids with a relatively nonvolatile oil to obtain a mixture which will remain fluid and pumpable after the removal of the water content therefrom;
2. Subjecting the resultant oil-containing mixture to dehydration by heat evaporation to yield water vapor and a substantially anhydrous solids in oil slurry;
3. Condensing said water vapor;
4. Separating most of the relatively non-volatile oil from said solids in oil slurry;
5. Substantially removing the residual non-volatile oil from the resultant oil-laden solids by extraction with a relatively low viscosity light oil; and
6. Bringing the resultant light oil-laden solids into direct contact with steam to thereby efficiently remove the light oil from said solids by heat evaporation.

The foregoing process is carried out in an apparatus for recovering clean water and dry, essentially oil-free solids from aqueous solids, said apparatus comprising a systematic arrangement of items of equipment as follows:

1. A tank adapted to receive a stream of said aqueous solids and provided with a stirring or mixing mechanism;
2. An oil reservoir;
3. Means for transmitting oil from said oil reservoir to said tank wherein oil and aqueous solids may be mixed;
4. An evaporator;
5. A conduit extending from said tank to said evaporator wherethrough may flow a stream of aqueous solids admixed with oil from said tank into the evaporating region of said evaporator;
6. A condenser;
7. A conduit extending from said evaporator to said condenser through which may flow water vapor formed as a result of heating of said aqueous solids and oil mixture;
8. Means for withdrawing water vapor condensate from said condenser as a clean water product;
9. A liquid-solid separating means;
10. A conduit extending from said evaporator to said liquid-solid separating means wherethrough may flow a stream of a slurry of substantially anhydrous solids in oil;
11. A light oil reservoir;
12. A conduit extending from said light oil reservoir to said liquid-solid separating means wherethrough may flow a stream of light oil from said reservoir to said liquid-solid separating means wherein said light oil may extract residual oil remaining on said solids after separation of oil therefrom;
13. A deoiler means;
14. A conduit extending from said liquid-solid separating means to said deoiler means wherethrough may flow a stream of light oil-laden solids; and
15. A combustion apparatus associated with said evaporator and said deoiler means for supplying evaporative heat to said evaporator and steam to come into direct contact with said light oil-laden solids in said deoiler means.

The instant invention thus provides process and apparatus for the recovery of residual oil from solids dehydrated in an oil medium and grossly deoiled. The invention is characterized by the recovery of clean water from aqueous solids which are dehydrated in a fluidizing oil medium. Residual fluidizing oil is removed from the essentially dehydrated solids by extraction with a relatively volatile, low viscosity light oil that is immiscible with water. The light oil-laden solids are thereafter brought into direct contact with steam. Since the light oil is water-immiscible, its direct contact with steam amounts essentially to a steam distillation wherein the light oil in the presence of steam boils at a temperature below its normal boiling point.

The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

Figure 1:
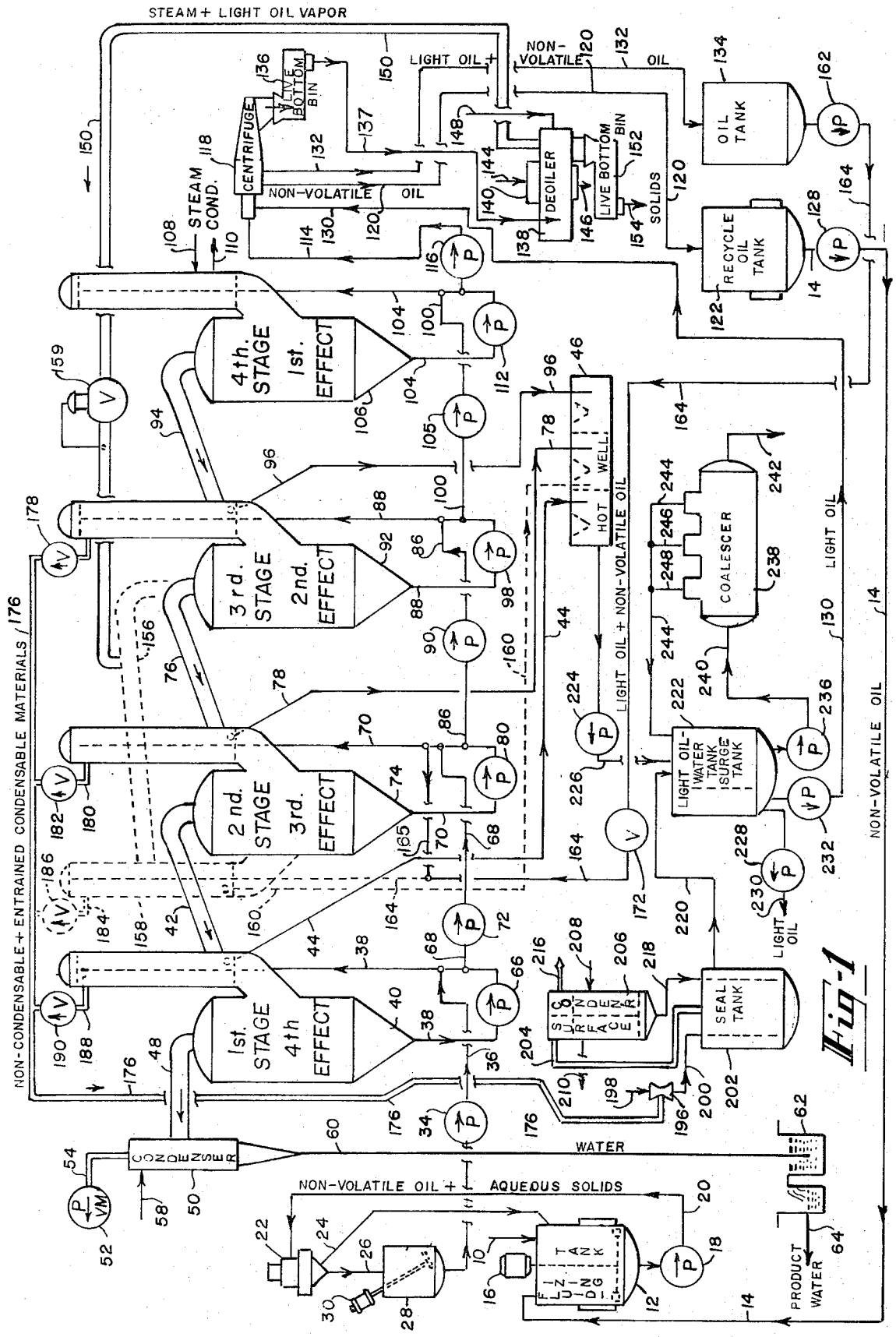
FIG. 1 illustrates the apparatus of the embodiment of the invention wherein blowing steam is brought into direct contact with light oil-laden solids in a deoiler apparatus to facilitate the removal of light oil therefrom.

The water recovery process of this invention as applied to aqueous solids is thus characterized by the recovery of residual oil from solids previously substantially dehydrated in an oil medium and grossly deoiled. The process comprises the steps of mixing aqueous solids with a relatively non-volatile oil to obtain a mixture which will remain fluid and pumpable after removal of essentially its entire water content and thereafter subjecting the resultant mixture of solids, water and oil to a dehydration step by heat evaporation with subsequent recovery of the evaporated water and a substantially anhydrous slurry of solids in oil. Extremely dilute aqueous solids may be concentrated by evaporation prior to mixing with the oil. The slurry of solids in oil is separated to yield the relatively non-volatile oil and solids laden with residual non-volatile oil. The residual non-volatile oil is substantially removed from the solids by extraction with a relatively low viscosity light oil that is immiscible with water. The light oil-laden solids are then brought into direct contact with steam whereby the relatively volatile light oil is removed by heat evaporation. In one embodiment of the invention wherein the solids are water-insoluble, the relatively light oil-laden solids are slurried with water and said slurry is indirectly contacted with steam in an evaporator to thereby cause evaporation of substantially all of the relatively light oil and at least some of the water. The solids are then removed from the remainder of the water as, for example, by means of a settling tank.

A critical step in the practice of the instant invention is the direct contacting of the relatively light oil-laden solids with steam to thereby effect evaporation of the relatively light oil. Thus, not only may the steam, if it is superheated, supply the latent heat for evaporation of the relatively light oil but, since said light oil and water are immiscible and since it is a well-known scientific fact that any mixture of two immiscible liquids must boil at a temperature lower than the boiling point of either of the two liquids, it follows that the relatively light oil is evaporated from the solids at an appreciably lower temperature than if the steam were merely an extraneous heat source that did not come into direct contact with the light oil-laden solids. On the other hand, the light oil-laden solids may be directly contacted with saturated steam at atmospheric pressure and about 212°F provided heat for vaporization of the light oil is supplied by an external source such as via a heat jacketed device. Lower steam temperatures in the range of about 150°F or less may be employed provided the contacting of the light oil-laden solids with steam is carried out under subatmospheric pressure and provided heat for vaporization of the light oil is supplied by an external source. It will be understood that, as a result of the external heat, the solids will in every case be at a temperature in excess of the boiling point of water at that particular pressure.

By relatively low viscosity, relatively light oil is meant an organic liquid that is water immiscible and relatively fluid as wall as relatively steam volatile compared to the non-volatile oil in which the dehydration step is carried out. Thus, by the practice of this invention, relatively volatile organic liquids that otherwise boil too high when heated by an extraneous heat source, e.g., about 150°–550°F, can be used to extract the residual relatively non-volatile oil of the dehydration step from the solids. Direct contact of the resultant relatively light oil-laden solids with steam amounts, in effect, to steam distillation wherein light oil that otherwise boil in the range of from about 150°F to about 550°F are distilled at temperatures within the range of from about 70°F to about 325°F.

In the practice of this invention, the essentially anhydrous slurry of solids in relatively non-volatile oil is separated to recover at least some of the oil and the solids in a largely dry condition but containing sorbed non-volatile oil. This may be accomplished by mechanical pressure of either a static or a dynamic variety, or both, on the anhydrous slurry whereby the greater part of the oil is expressed from the solids. In some cases, as in the processing of sewage or slaughter house wastes, the waste itself contains an apppreciable amount of oil independently of oil which may be adeded to it prior to the dehydration step. This oil will be carried through the dehydration step along with the solids and the added oil and be subjected to being pressed out of the dehydrated slurry along with the added oil. If the essentially water-free slurry be pressed sufficiently vigorously, it may thus be made to yield oil in a quantity or at a rate equal to or in excess of that in or at which oil was previously added to the aqueous solids. Generally it is desirable that the pressing step yield enough oil for reuse in the dehydration step that the process will be self-sufficient with respect to non-volatile oil requirements. Even more desirably, in some cases the pressing step will generate somewhat more non-volatile oil than is needed for the dehydration step so that the process will provide a net oil yield.

No matter how vigorous the pressing of the anhydrous slurry of solids in non-volatile oil, the recovered solids will have sorbed thereon appreciable quantities of non-volatile oil which, if not recovered, will be lost to the process. In the practice of this invention, the non-volatile oil-laden solids are extracted with a relatively light oil to thus remove the non-volatile oil therefrom. The extraction may conveniently be carried out in the liquid-solid separating means in which the non-volatile oil is expressed from the solids. While the liquid-solid separating means may be of the static variety, e.g., a cage-type piston press, as shown in our aforementioned U.S. Pat. No. 3,716,458 it is advantageous to employ a dynamic separating means such as a centrifuge. Accordingly, most of the non-volatile oil is pressed from the solids in, for example, a centrifuge, and the oil may be collected in a suitable reservoir where it is available for reuse in the process if so desired. The non-volatile oil-laden solids remaining in the centrifuge are then contacted therein with the relatively light oil, and the relatively light oil containing extracted non-volatile oil is thereafter pressed from the waste solids. The mixture of relatively light oil and extracted non-volatile oil may, if desired, be separating by distillation, e.g., returned to the evaporation system for recovery of light oil from the non-volatile oil, and the individual components reused in the process.

The solids having relatively light oil sorbed thereon are then brought into direct contact with steam. The steam, if superheated, supplies latent heat for the evaporation of the light oil or, alternatively, saturated steam at about 212°F may be used in conjunction with external heat as from a steam jacket to supply heat for evaporation of the light oil. Since the light oil is water-immiscible, its direct contact with the steam amounts essentially to a steam distillation wherein the light oil boils at a temperature below its normal boiling point. Thus it makes possible the use of higher boiling light oils.

The direct contacting of light oil-laden solids with steam, as discussed above, permits evaporation of the light oil at a temperature below its normal boiling point. However, in certain applications such as deoiling of temperature sensitive materials like food products for human consumption and animal feeds, even lower temperatures for evaporation of the light oil are desired. This may be accomplished by contacting the light oil-laden solids with steam at less than atmospheric pressure.

The removal of light oil from the solids by direct contact with steam may conveniently take place in a deoiler apparatus which may advantageously be connected to the discharge of the centrifuge. If desired, the deoiler apparatus may be externally heated as by means of a steam jacket. Steam, known as blowing steam, is passed into the deoiler apparatus containing the light oil-laden solids. It is desirable to utilize excess blowing steam and vaporized light oil from the deoiler apparatus in the process as a source of heat. The vaporized light oil is eventually condensed and reused in the process.

In a modification of the foregoing embodiment, light oil-laden solids are brought into direct contact with steam in the vapor chamber of an evaporator in the system rather than in a separate deoiler apparatus.

In one embodiment of the invention, non-volatile oil-laden solids that are water-insoluble are conducted from the liquid-solid separating means to a repulping tank where they are slurried with relatively volatile water-immiscible light oil. The resultant slurry is conducted to a second liquid-solid separating means where the light oil containing extracted non-volatile oil is separated from the solids. The solids, having residual light oil and sometimes traces of non-volatile oil sorbed thereon, are conducted to a second repulping tank where they are slurried with water. The aqueous slurry is then conducted to the evaporating region of an evaporator where it is brought into indirect thermal contact with steam resulting in evaporation of the water in the aqueous slurry mixture containing light oil. The evaporated water vapor from the slurry causes evaporation of light oil by reduction of its boiling point, and consequently all of the light oil can be distilled provided there be sufficient water available. In actual fact considerably more water must be present to also provide fluidity for the insoluble solids, a requirement for material handling in the evaporator. The solids are then separated from the remaining water by such means as filtration or a settling tank.

The solids left after removal of the relatively light oil therefrom may often be utilized for purposes outside the process itself and thus constitute a process product. The process and apparatus of this invention may be used to dehydrate aqueous solids derived from numerous sources whether they be waste solids or solids having intrinsic value. Thus, for example, this invention finds utility in the recovery of oil, either originally present and/or added, from a variety of materials which are found in aqueous solution or water dispersion, e.g., powdered coal, food products, animal feeds and wastes, cement, spent lime, inorganic salts, sewage, sewage sludge, slaughter house effluent and rendering products, slimes, black liquor from the paper industry, pharmaceutical products and wastes, cannery or canning factory effluent, chemicals, etc. Accordingly, depending on the source, the solids recovered from the steam contacting operation may be used, for example, as fertilizer, as animal feed, or as food products for human consumption. Further, since they are often burnable, they may be used as fuel for the generation of steam needed to run the evaporator component of the apparatus, blowing steam for contacting the light oil-laden solids, and also the steam needed to run auxiliary equipment such as pumps, either directly if they be steam-driven pumps or indirectly if they be motor driven pumps and the steam is used to run a turbo-generator directly. The process may thus be at least partly self-sufficient in respect of fuel requirements. The process and apparatus of this invention thus provide means for the efficient recovery of residual oil from aqueous solids dehydrated in an oil medium and grossly deoiled and, in addition, allow for the recovery of valuable products and by-products therefrom. Furthermore, this invention is characterized by the fact that clean water from the dehydration step is effectively recovered.

The material to be treated by the process of this invention should contain solid particles having a maximum size of about one/fourth inch. Larger particles may be ground to size or comminuted by existing techniques.

The non-volatile oils that are utilized for admixture with the aqueous solids prior to the dehydration operation are inert, relatively non-volatile oils or fats, or other oil-like materials. Typical of these are tallow, other animal fats and vegetable oils, all of which often can be derived directly from the process operation; petroleum oils and their fractions and derivatives including fuel oils; silicone oils; glycerines, gylcols and mixtures thereof; and miscellaneous liquid wastes from industrial plants, being generally of an organic nature. It is desirable to employ an oil that imparts process credits, i.e., one that can add value to the solids product, such as waste oils normally found in sewage or industrial waste, or fuel oils, or, as suggested above, employ oils derived in the practice of the process itself so as to minimize cost factors. The quantity of oil is such that its ratio in the system is in the range of about 2 to about 20 parts or more by weight, based on each part of non-fat or non-oil based solids. This refers to total oil, i.e., that added plus that derived from the process for reuse. This amount of oil gives fluid, pumpable mixture even in the absence of water. The term "fluid" as used here is intended to be synonomous with "liquid," i.e., taking the shape of the container to the extent that the mixture fills the container. This will also include heavy, viscous fluids which are pumpable but still suitable for heat transfer purposes.

The relatively light oils used to extract the residual relatively non-volatile oil from the solids after the dehydration step are inert, water-immiscible, and miscible with the non-volatile oil to be extracted. In addition, they should be sufficiently volatile to be evaporated by direct contact with steam at a temperature within the range of from about 70°F to about 325°F. Generally, light oils boiling within the range of from about 150°F to about 550°F, and preferably from about 300°F to about 450°F, are contemplated as being useful for this purpose. The usually preferred class of light oil employed for extraction of residual non-volatile oil is light hydrocarbon oils. The light hydrocarbon oil may be normal paraffinic, isoparaffinic, aromatic, or naphthenic. Examples of suitable light hydrocarbon oils are n-pentane, isopentane, n-hexane, cyclohexane, benzene, isooctane, eicosane, petroleum fractions boiling in the range of from about 300°F to about 450°F, isohexane xylene, octadecane, toluene, n-heptane, cyclopentane, and mixtures thereof. Another class of suitable light oil is water-immiscible fatty alcohols. Examples of suitable alcohols are n-hexyl alcohol, n-heptyl alcohol, isoheptyl alcohol, n-octyl alcohol, isooctyl alcohol, n-nonyl alcohol, and n-decyl alcohol. Fatty acids such as caproic acid and capric acid may also be used as the light oil. In processing food products and animal feeds, an FDA approved light oil such as Isopar series of isoparaffinic oils manufactured by Humble Oil and Refining Company may be used. The quantity of light oil used for the extraction of residual non-volatile oil from the solids is not critical and is well within the purview of one skilled in the art to determine. The quantity of light oil will depend on such factors as, for example, degree of intimacy of contact of oil-laden solids with light oil; the quantity of oil-laden solids; the amount of residual oil sorbed on the solids which is a function of particle size, shape, and porosity; and the number of extractions of the oil-laden solids with the light oil.

While the dehydration step of this invention may be carried out in a single stage or single effect evaporators known in the art, it is preferred that this step be accomplished in a plurality of sequential heat evaporation steps wherein each of the successive evaporation steps is at a succesively higher temperature and the resulting solids streams are of succesively higher concentration because of increasing dehydration, the evolved vapors of each evaporation step supplying a substantial portion of the heat requirements of the preceding heat evaporation step. Thus the plurality of sequential heat evaporation steps connotes at least two. The equipments that can be employed are multiple-effect evaporators known in the art, e.g., Mojonnier, Bufflovak, Rodney-Hunt, recompression type evaporators such as thermal or mechanical recompresion types, etc. Functionally, evaporator equipment may be of the forced circulation, flash, falling film recirculation, single pass, rotary wiped film, plate, or indeed any suitable type. The temperatures, pressures and concentrations in each of the successive series of evaporation steps are largely empiric in nature, depending upon the systems and oils being employed. The normal processing temperatures for the dehydration of the oil-aqueous solids mixture may be in the range of about 70° F to about 250°F in the first stage and about 100°F to about 400°F in the second, third or final stages of a multi-effect drying system. The preferred processing temperatures are in the range of about 90°F to about 175°F in the first stage and about 200°F to about 350°F in the second, third or last stages. The foregoing ranges and progressions of temperatures are reasonable in the case where the flows through the evaporator of the mixture being dehydrated and the heating or drying steam are substantially countercurrent, the evaporator in this mode of operation being called a "backward flow" evaporator. The temperatures also depend on the desired quality of the end product and the economics of fuel utilization, cooling water availability, capital investment, etc.

In the foregoing paragraph the expression "first stage" refers to that part of the evaporator equipment in which the oil-aqueous solids mixture is subjected to the first step of a sequential plurality of evaporation steps, two or three or more corresponding to "second stage," "third stage," etc. The expression "effect," on the other hand, as in "multiple-effect" or "multi-effect," is related to the flow and action of the heating medium, customarily steam, in the evaporator equipment. Where the flow of an oil-aqueous solids mixture being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ½ inch Hg absolute to approximately atmospheric. The pressures then increase in successive stages responsive to the temperatures in the aforedescribed countercurrent or backward flow case. It is advantageous to operate the first stage at subatmospheric pressure and the final stages at close to atmospheric.

The advantage of the sequential evaporation steps may be seen from the following. For example, in a double-effect evaporator with feed entering at 80°F, the material can leave the evaporator at 225°F–250°F with ratios of approximately 1 pound of steam utilized for approximately 1½ to 1¾ pounds of water evaporated; whereas in normal single-effect operations about 1½ pounds of steam could be required to achieve the same result with only 1 pound of water evaporated. If triple or more effect evaporation be utilized, even further economies in fuel consumption are made possible. It should be noted that the evolved vapors from each of the heat evaporation steps after the first step supply a substantial portion of the heat requirement of the preceding heat evaporation step or stage in the case of a backward flow evaporator. The only net or external heat input required is that needed to raise the temperature of the components to evaporation temperatures; provide the latent heat of evaporation in the first effect, and make good for heat losses. The final product from the dehydration step is generally an oil-solids slurry containing no more than about 5–10 weight percent water on a non-fat basis.

The separation of solids from the non-volatile fluidizing oil can be conveniently carried out in a liquid-solid separating means, preferably in a dynamic press such as a centrifuge. It is often advantageous to extract the oil-laden solids with the light oil in the centrifuge. This may be accomplished, for example, in a single extraction using a continuous screen bowl centrifuge where the non-volatile fluidizing oil is separated from the solids in the first stage of the centrifuge and the oil-laden solids are extracted with the relatively light oil in the second stage, screen bowl portion of the centrifuge. In the case where the solids are not conducive to a screen bowl centrifuge and where the oil-solids slurry contains some of the relatively light oil or has a low solids to fluidizing oil ratio, a double centrifuge extraction system may be employed. In the double centrifuge extraction system, an oil-solids mixture, preferably containing a viscosity-reducing amount of the light oil, is fed to a first centrifuge where the mixture of fluidizing oil and relatively light oil are separated from the solids. The solids with residual fluidizing oil and light oil sorbed thereon are placed in a repulping tank and slurried with fresh light oil. This slurry is fed to a second centrifuge where the light oil and the residual non-volatile fluidizing oil are separated from the solids.

The solids having residual light oil sorbed thereon which are recovered from the liquid-solid separating means, e.g., centrifuge, after the extraction step are then brought into direct contact with steam for removal of the residual light oil therefrom. In the embodiment of the invention exemplified in FIG. 1, light oil-laden solids exiting from the centrifuge enter a deoiler apparatus where they are brought into direct contact with blowing steam. The deoiler apparatus may advantageously be externally heated as by passing steam through a heating jacket surrounding it. While the blowing steam may be superheated in the range of about 250°F to 500°F, the blowing steam may also be saturated steam at close to 212°F and atmospheric pressure. The blowing steam coming in contact with light oil-laden solids within the deoiler apparatus causes evaporation of the relatively light oil. The vaporized light oil and excess blowing steam may advantageously be conducted from the deoiler apparatus and the energy thereof recovered as useful work as, for example, by being used as a source of heat in the evaporator stage of the system.

Figure 2:
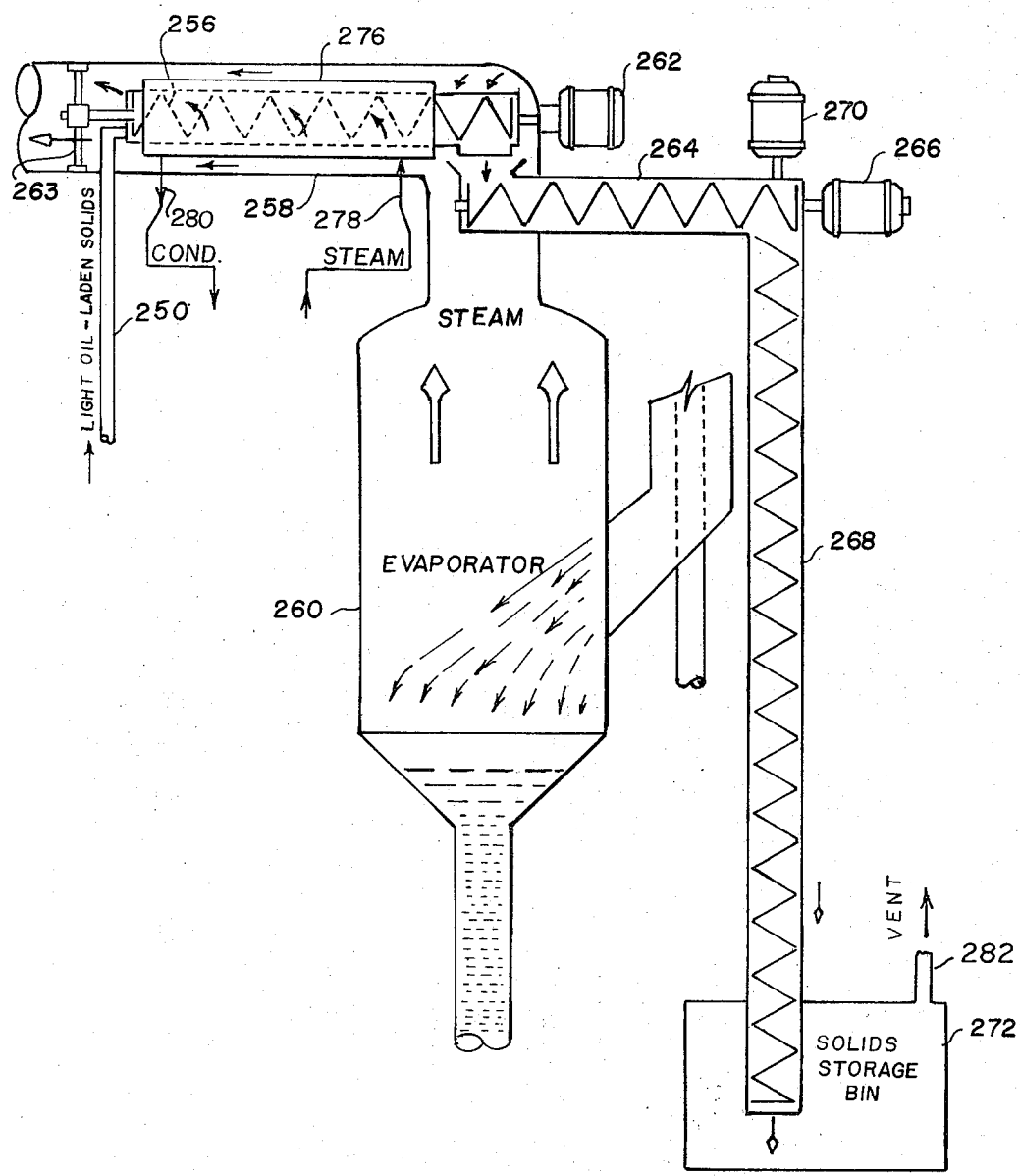
FIG. 2 depicts a portion of the apparatus of FIG. 1 illustrating the embodiment wherein light oil-laden solids are brought into direct contact with steam in the vapor duct leading from the vapor chamber of an evaporator.

In the embodiment depicted in FIG. 2, the light oil-laden solids recovered from the centrifuge are brought into direct contact with steam in the vapor duct leading from the vapor chamber of an evaporator. Latent heat is provided by an external heating source. Again, vaporized light oil and excess steam are used to supply at least part of the heat requirement of a preceding heat evaporation step.

Figure 3:
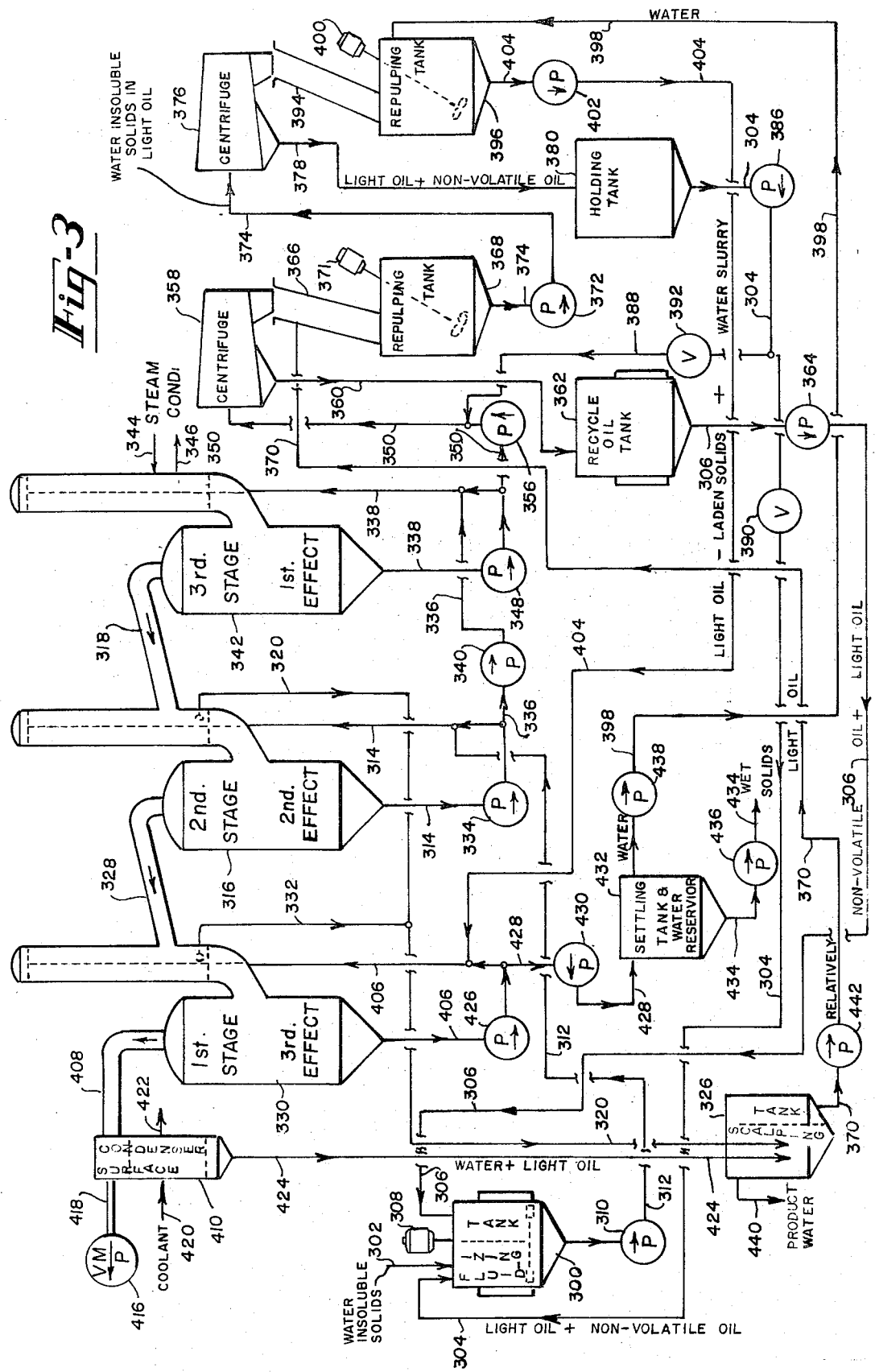
FIG. 3 illustrates the apparatus of that embodiment of the invention wherein light oil-laden water-insoluble solids are slurried with water and said slurry is conducted to an evaporator where indirect thermal contact with steam causes evaporation of the light oil and at least some of the water.

In the embodiment of this invention that is illustrated in FIG. 3 and which applies to water-insoluble solids, non-volatile fluidizing oil-laden solids are conducted from a first centrifuge to a repulping tank where they are slurried with light oil. The resultant slurry is conducted to a second centrifuge where light oil and extracted fluidizing oil are separated from the solids. The light oil-laden solids obtained from the second centrifuge are placed in a second repulping tank and slurried with water. The water slurry is conducted from the second repulping tank to the evaporating region of an evaporator where the slurry comes into indirect thermal contact with steam. Essentially all of the light oil content of the slurry and parts of the water content thereof are evaporated. The remaining water-solids slurry is separated into its liquid and solid components by such means as filtration or use of a settling tank.

Figure 4:
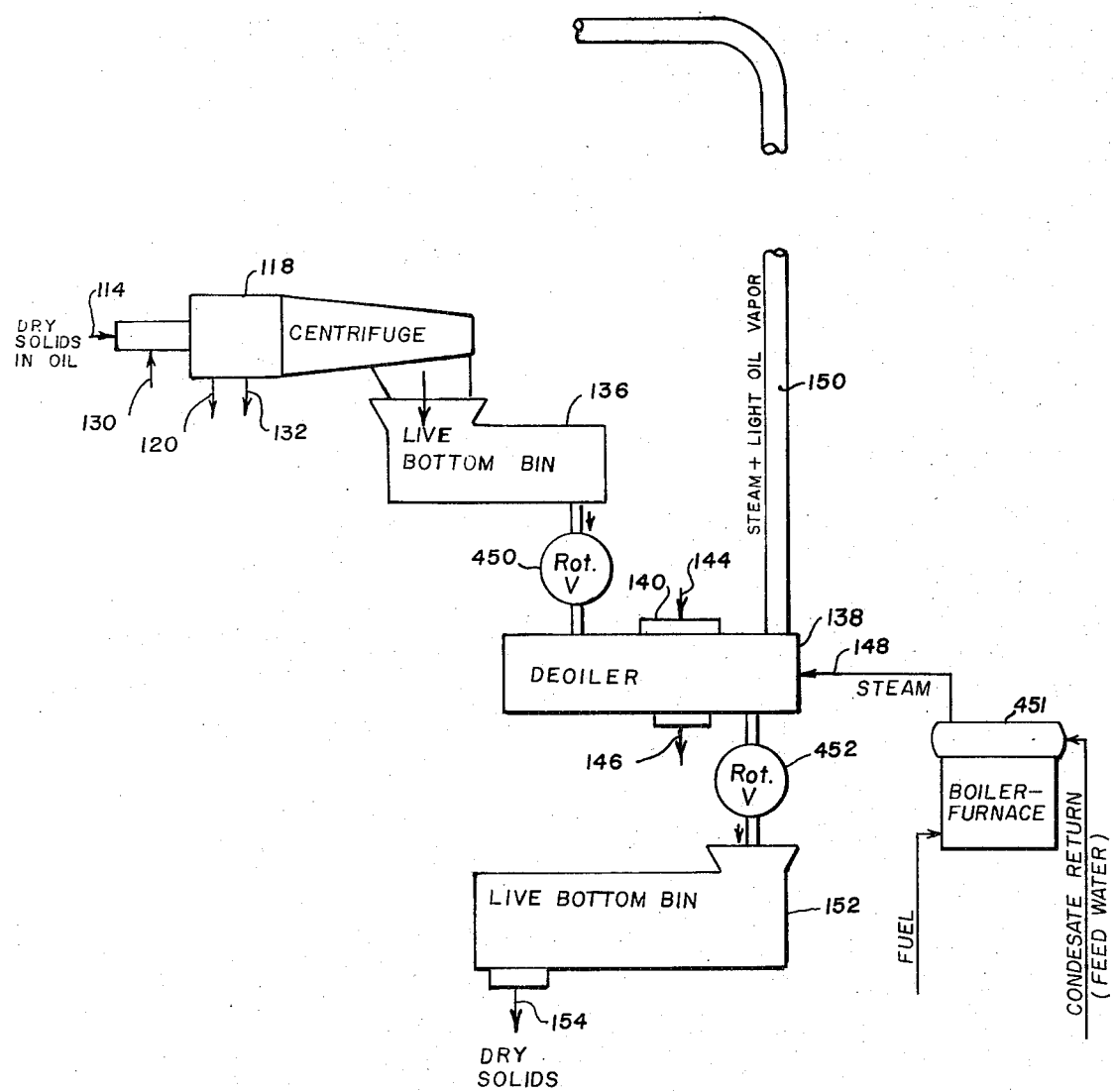
FIG. 4 depicts a portion of the apparatus of FIG. 1 illustrating the embodiment wherein the deoiler apparatus is operated under reduced pressure.

In the embodiment of the invention shown in FIG. 4, the deoiler apparatus is connected directly to a drying evaporator operating under reduced, or less than atmospheric, pressure. As a result, the deoiler apparatus is also under reduced pressure. Hence, the deoiling operation requires less blowing steam and may be carried out at reduced temperature, an advantage when deoiling a temperature sensitive material such as a food product or an animal feed.

This invention will be more clearly perceived and better understood through reference to the preferred embodiments as discussed in further detail in connection with the flow diagrams shown in the drawings. While this invention is useful for the dehydration and deoiling of aqueous solids generally, it is illustrated here in connection with the dehydration and subsequent deoiling of aqueous waste solids. In the embodiment illustrated in FIG. 1, a stream of aqueous waste solids in solution or dispersion enters fluidizing tank 12 through line 10. Non-volatile fluidizing oil enters fluidizing tank 12 through line 14. The fluid mixture in fluidizing tank 12 is agitated by means of stirring device 16 and then withdrawn from the fluidizing tank by means of pump 18. Pump 18 delivers the mixture through line 20 to fine grinder 22 where solid particles are ground to a maximum size of about one/fourth inch. Part of the output from grinder 22, such as hard to grind materials, is recycled to fluidizing tank 12 through line 24 while the remainder of the output is conducted through line 26 to feed tank 28. The fluid mixture in feed tank 28 is agitated by means of stirring device 30 and then withdrawn from the feed tank by means of pump 34. Pump 34 delivers the fluid mixture through line 36 which meets line 38 at a T-joint or connection. The fluid mixture is conducted through line 38 to the first stage or fourth effect evaporator 40 of an overall drying evaporator assembly or array. In evaporator 40 water is boiled off at a subatmospheric pressure which may typically be about 2 to 10 inches Hg absolute. The temperature of the partially dehydrated product of the entering mixture of aqueous waste solids in non-volatile fluidizing oil is in the range of about 70°–250°F and preferably about 90°–175°F, depending on the pressure in the evaporator. The system is heated by vapor from line 42 which is at a temperature about 30°–40°F higher than the temperature of the partially dehydrated aqueous waste solids in oil mixture. Condensate of the heating vapor is withdrawn through line 44 to hot well 46. Water vapor formed as a result of the partial dehydration of the entering mixture of aqueous waste solids in non-volatile oil is removed from the vapor chamber of evaporator 40 through line 48 into barometric condenser 50 within which a partial vacuum is maintained by means of vacuum pump 52 which is connected to condenser 50 via vacuum line 54.

Water vapor entering condenser 50 through line 48 is mixed with and condensed by cooling water entering the condenser through line 58, and the resulting stream of warm water is discharged through line 60 into hot well 62. From hot well 62, product water is drawn off through barometric discharge line 64. If desired, part of the product water may be reused throughout the system. Alternatively, all the recovered water may be stored in a reservoir for later use in applications in which essentially clean water is required.

The partially dehydrated mixture of aqueous waste solids in oil from evaporator 40 is continuously removed through line 38 with the assistance of pump 66. Line 38 meeets line 68 at a T-joint whereby part of the mixture discharged from evaporator 40 through line 38 is recycled through line 38 back to evaporator 40 and part of the mixture enters line 68 which meets line 70 at a T-joint. Pump 72 forces the partially dehydrated mixture through line 68 and ultimately line 70 to second stage 74 of the evaporator. In the second stage evaporator a procedure is followed which is similar to that in the first stage except that the pressure is generally higher. The pressure in each succeeding evaporator stage is usually somewhat higher than in the preceding stage, approaching approximately atmospheric pressure in the last stage. The temperature of the further dehydrated product of the second stage evaporator is in the range of about 100°–400°F and preferably about 200°–350°F, depending on the pressure in the evaporator. The heating medium is steam which is at a temperature about 30°–40°F higher than the temperature of the further dehydrated aqueous waste solids slurry leaving the second stage evaporator. The heating steam comes through line 76 from the vapor chamber of the third or succeeding evaporator stage. Condensate of the heating steam is withdrawn through line 78 and is discharged into hot well 46.

The further dehydrated slurry of aqueous waste solids in oil withdrawn from second stage evaporator 74 is discharged through line 70 by pump 80. Line 70 meets line 86 at a T-joint whereby part of the slurry discharged from evaporator 74 through line 70 is recycled through line 70 back to evaporator 74 and part of the mixture enters line 86 which meets line 88 at a T-joint. Pump 90 forces the further dehydrated mixture through line 86 and ultimately through line 88 to third stage 92 of the evaporator. The pressure in the third stage is generally higher than that in second stage evaporator 74 but is advantageously somewhat less than atmospheric. The temperature of the still further dehydrated mixture of aqueous waste solids in oil leaving the third stage of the evaporator is within the range of about 100°–400°F, preferably about 200°–350°F, and is usually somewhat higher than that from second stage evaporator 74. The heating medium is steam at a temperature about 30°–50°F higher than that of the product, and it comes from the vapor chamber of the succeeding or fourth stage of the evaporator through line 94. Condensate of the heating steam is withdrawn through line 96 and is discharged into hot well 46.

The still further dehydrated slurry of waste solids in oil withdrawn from third stage evaporator 92 is discharged by pump 98 through line 88. Line 88 meets line 100 at a T-joint whereby part of the mixture discharged from evaporator 92 through line 88 is recycled through line 88 back to evaporator 92 and part of the mixture enters line 100 which meets line 104 at a T-joint. Pump 105 forces the slurry through line 100 and ultimately line 104 to fourth stage 106 of the evaporator. The pressure in the fourth stage is usually higher than in the third stage, advantageously being approximately atmospheric. The temperature of the product of fourth stage evaporator 106, i.e., a slurry of waste solids in oil containing about 1 percent by weight of water based on the entire slurry, is generally greater than that of the product of third stage evaporator 92 and is within the range of about 100°–400°F and preferably about 200°–350°F. The heating medium is steam at a temperature about 30°–50°F higher than that of the product, i.e., an essentially anhydrous slurry of waste solids in oil. This steam is generated in a boiler-furnace and conveyed to fourth stage 106 of the evaporator through line 108. Condensate of the heating steam is withdrawn through line 110 and returned to the boiler-furnace, not shown, being of any suitable and convenient design as illustrated and described in our aforementioned U.S. Pat. No. 3,716,458, or as shown in FIG. 4.

The essentially anhydrous slurry of waste solids in oil withdrawn from fourth stage evaporator 106 is discharged by pump 112 through line 104. Line 104 meets line 114 at a T-joint whereby part of the mixture discharged from evaporator 106 through line 104 is recycled through line 104 back to evaporator 106 and part of the mixture enters line 114. Pump 116 forces the slurry through line 114 to continuous centrifuge 118 which is fitted with a solid bowl first section and a screen bowl second section. The gross or greater part of the relatively non-volatile fluidizing oil is separated from the waste solids in the solid bowl first section of centrifuge 118 and is conducted therefrom via line 120 to recycle fluidizing oil tank 122. Recovered fluidizing oil is discharged by pump 128 through line 14 to fluidizing tank 12 for recycling through the system. If the process provides a net yield of fluidizing oil, it may be recovered from recycle oil tank 122 and stored for use outside the system.

The waste solids, containing residual fluidizing oil sorbed thereon, move from the solid bowl first section of centrifuge 118 to the screen bowl second section of the centrifuge. A relatively volatile, low viscosity light oil that is immiscible with water is conducted through line 130 into the screen bowl section of centrifuge 118 where it comes into intimate contact with the waste solids having residual fluidizing oil sorbed thereon. The relatively light oil extracts the fluidizing oil from the waste solids in the screen bowl section of centrifuge 118, and the mixture of light oil and extracted fluidizing oil is conducted from the centrifuge through line 132 to tank 134.

The waste solids, having residual relatively light oil sorbed thereon, exit from the screen bowl section of centrifuge 118 and enter live bottom bin 136. The live bottom of bin 136 causes the waste solids to advance to the exit thereof where they fall by gravity through conduit 137 into cake deoiler apparatus 138. Deoiler apparatus 138 may, if desired, be externally heated by steam generated in a boiler furnace which enters steam jacket 140 through line 144. Condensate of the jacket steam is withdrawn through line 146 and returned to the boiler furnace. Blowing steam generated in the boiler furnace is conducted via line 148 into deoiler apparatus 138 where said steam comes into direct contact with the relatively light oil-laden waste solids and causes vaporization of said light oil at a temperature below its normal boiling point. Blowing steam and vaporized light oil exit from the deoiler apparatus through line 150.

The waste solids, free from sorbed light oil, are discharged by gravity from deoiler apparatus 138 into live bottom bin 152. The screw conveyor bottom of bin 152 conducts the waste solids to the exit thereof where said waste solids, free from fluidizing oil and light oil as well as being in an essentially dry state, are discharged through line 154.

Blowing steam and vaporized light oil exiting from deoiler apparatus 138 are conducted by line 150 to line 156 to which it is connectd by a T-joint. Line 156 conducts steam from the vapor chamber of third stage evaporator 92 to evaporator tube bundle 158 which is attached to second stage evaporator 74. Since the second and third evaporator stages are operated at less that atmospheric pressure, a valve 159 which is equipped with a pressure sensor is located on line 150 and serves to maintain slightly less than atmospheric pressure in deoiler apparatus 138. The deoiling step is therefore conducted at essentially atmospheric pressure. Thus, in the embodiment shown, the energy of the blowing steam and the vaporized light oil are recovered as useful work by supplying heat to evaporator tube bundle 158 which is attached to second stage evaporator 74. Condensate of the heating steam and vaporized light oil is withdrawn through line 160 and is discharged into hot well 46. While the blowing steam and the vaporized light oil from deoiler apparatus 138 are depicted in FIG. 1 as supplying evaporating heat to independent tube bundle 158 on second stage evaporator 74, it will be understood that an independent evaporator tube bundle need not be used and that the energy of the mixed vapors may be recovered by supplying heat to any evaporating stage in the system, except first concentrating stage 40 when condenser 50 is of the barometric type.

The mixture of relatively light oil and extracted fluidiziing oil in tank 134 is discharged by pump 162 through line 164 to evaporator tube bundle 158 on second stage evaporator 74. The rate of flow through line 164 is controlled by valve 172. The extracted fluidizing oil fraction becomes combined with the partially dehydrated slurry of waste solids in oil that is withdrawn from second stage evaporator 74 through line 70 while the relatively light oil is vaporized and, along with the steam, is conducted from the vapor chamber of second stage evaporator 74 through line 42 to serve as the heating medium in first stage evaporator 40. It will again be understood by those skilled in the art that independent evaporator tube bundle 158 need not be used but that the mixture of light oil and extracted fluidizing oil may be discharged from tank 134 to any evaporating stage in the system.

Line 165 is connected by a T-joint at one end to line 70 and by a T-joint at its other end to line 164. The rate of flow of light oil and extracted fluidizing oil through line 164, as well as the pressure in line 164, are controlled by valve 172 so that part of the slurry of aqueous waste solids in oil passing through line 70 is shunted through line 165 to line 164 and ultimately to evaporator tube bundle 158 where said slurry is subjected to further evaporation.

From the top of the evaporating region of third stage evaporator 92 extends line 176 through which are conducted noncondensable materials plus entrained condensable materials. Access to line 176 is controlled by valve 178. Line 180, controlled by valve 182, leads from the top of the evaporating region of second stage evaporator 74 to line 176 which it joins at a T-joint. Similarly, line 184, controlled by valve 186, connects the top of independent evaporting region 158 to line 176 and line 188, controlled by valve 190, connects the top of the evaporating region of first stage evaporator 40 to line 176. A partial vacuum is maintained in line 176 by means of ejector 196 which is supplied with steam through line 198. By adjusting valves 178, 182, 186 and 190, the desired degrees of reduced pressure may be maintained, respectively, in the third, second, and first stages of the evaporator.

Steam from ejector 196 as well as non-condensable and condensable materials are conducted through line 200 to condensables seal tank 202. Non-condensable materials and entrained condensable materials are conducted by line 204 from condensables seal tank 202 to surface condenser 206. Surface condenser 206 is cooled by cooling water entering the condenser through line 208 and leaving through line 210. Non-condensable materials exit from surface condenser 206 through line 216. Entrained condensable materials are returned to condensables seal tank 202 from surface condenser 206 through line 218. Condensable materials, essentially comprising water and the relatively light oil, are conducted by line 220 from condensables seal tank 202 to tank 222 which is divided into a light oil-water tank and a light oil surge tank. Condensate, essentially comprising water and the light oil, is forced by pump 224 from hot well 46 to tank 222 through line 226.

Inside tank 222, the mixture of water and relatively light oil is separated into essentially pure light oil which enters the light oil surge tank and partially clarified water containing some light oil which remains in the light oil-water tank. Excess light oil is forced by pump 228 through line 230 from the light oil surge tank part of tank 222 to storage tanks. Light oil needed in the process to extract fluidizing oil from the waste solids is forced by pump 232 from the light oil surge tank part of tank 222 through line 130 to continuous centrifuge 118.

Partially clarified water containing some of the relatively light oil is forced by pump 236 from the light oil-water tank part of tank 222 to coalescer 238 through line 240. Clarified condensate comprising clean water is removed from coalescer 238 through line 242 and conducted to storage tanks. Light oil which is separated from the water in coalescer 238 is removed from the coalescer through line 244 and through lines 246 and 248 which connect with line 244 at T-joints. Line 244 conducts the light oil back to tank 222 where it enters the light oil surge tank part thereof and ultimately goes to storage tanks or is conducted to continuous centrifuge 118 for the purpose of extracting fluidizing oil from the waste solids.

FIG. 2 depicts a portion of the apparatus used in a modification of the apparatus of FIG. 1 wherein light oil-laden waste solids are conveyed from the discharge chute of continuous centrifuge 118 to the line or vapor duct leading from the vapor chamber of an evaporator instead of being conveyed to a deoiler apparatus per se. While the light oil-laden waste solids may be directly contacted with steam in a vapor duct leading from the vapor chamber of any stage of the evaporating system, it is preferred that it be conducted to the vapor duct leading from the vapor chamber of the second or any higher stage of the evaporating system. The advantages of contacting the light oil-laden waste solids with steam in a vapor duct leading from a second or higher stage of the evaporating system are that the steam is at a higher temperature, and, in addition, excess steam and vaporized light oil may be used to supply at least part of the heat requirements of a preceding evaporating stage.

In FIG. 2, light oil-laden waste solids from the discharge chute of a continuous centrifuge are conveyed by line 250 to screw conveyor 256 inside vapor duct 258 leading from the vapor chamber of evaporator 260. Motor 262 rotates the screw element of conveyor 256 to thereby move the light oil-laden waste solids countercurrent to the steam from evaporator 260 which is passing through vapor duct 258. The steam in vapor duct 258 comes into direct contact with the light oil-laden waste solids in screw conveyer 256 and causes vaporization of the light oil at a temperature below its normal boiling point. Conveyor 256 comprises not only a screw element but also an enclosing casing extending beyond steam jacket 276 at either end as shown, especially at the right end. That casing is in the form of a trough open at the top to allow the entry and exit of steam sweeping leftwardly over oil-laden solids being moved rightwardly. It has a bottom opening at its right end wherethrough solids fully swept by steam may drop out. At its left end the screw element of the conveyor is supported by a spider or framework element 263 which is entirely open to permit the passage of vapors through it. Latent heat is supplied to steam jacket 276 surrounding screw conveyer 256 by steam from an outside source entering through line 278 while condensate is removed from steam jacket 276 through line 280. Excess steam from evaporator 260 and vaporized light oil move through vapor duct 258, preferably to supply at least part of the heat requirements of a preceding evaporating stage.

The waste solids, free from sorbed light oil, are discharged from screw conveyor 256 into screw conveyor 264 which is rotated by motor 266. Screw conveyor 264 conducts the light oil-free waste solids out of vapor duct 258 and discharges them into screw conveyer 268 which is rotated by motor 270. Screw conveyor 268 conducts the light oil-free waste solids to storage bin 272 which is vented to the atmosphere through pipe 282. The weight, or head, of solids within screw conveyor 268 overcomes any pressure differential in the system and acts as a barometric leg.

FIG 3 illustrates the flow diagram of the apparatus of that embodiment of the invention wherein light oil-laden water-insoluble waste solids are slurried with water and the resultant slurry is conducted to an evaporator where indirect thermal contact with steam is made to evaporate water. The evaporated water causes evaporation of the light oil and there is sufficient water available to maintain fluidity of the insoluble solids at the same time all of the light oil has been distilled by the evaporated water by reduction of its boiling point. In the embodiment of the process employing the apparatus depicted in FIG. 3, a stream of water-insoluble waste solids in aqueous dispersion enters fluidizing tank 300 through line 302. Mixtures of non-volatile fluidizing oil and relatively light oil enter fluidizing tank 300 through lines 304 and 306. The fluid mixture in fluidizing tank 300 is agitated by means of stirring device 308 and then withdrawn from the fluidizing tank by means of pump 310. Pump 310 delivers the mixture through line 312 which meets line 314 at a T-joint or connection. The fluid mixture is conducted through line 314 to the evaporating region of second stage evaporator 316 of an overall three-stage evaporator assembly or array. In evaporator 316 water and relatively light oil are boiled off at a pressure which may typically be between about 2 to 10 inches Hg absolute and about atmospheric. The temperature of the partially dehydrated and partially deoiled product of the entering mixture of aqueous waste solids in non-volatile fluidizing oil and relatively light oil is in the range of about 100°–400°F and preferably about 200°–350°F, depending on the pressure in the evaporator. The system is heated by vapor from line or vapor duct 318 which is at a temperature about 30°–40°F higher than the temperature of the partially dehydrated and partially deoiled mixture of aqueous waste solids in fluidizing oil and light oil. Condensate of the heating vapor is withdrawn through line 320 to scalping tank 326. Water and light oil vapors formed as a result of the partial removal by evaporation of water and light oil from the entering mixture of aqueous waste solids in fluidizing oil and light oil is removed from the vapor chamber of evaporator 316 through vapor duct 328 to the evaporating region of first stage evaporator 330 where the mixed vapors serve as the source of heat for said first stage evaporator. Condensate of the mixed heating vapors is withdrawn through line 332, which meets line 320 at a T-joint, and then through line 320 to scalping tank 326.

The partially dehydrated and partially deoiled mixture of aqueous waste solids in non-volatile fluidizing oil and relatively light oil from evaporator 316 is continuously removed through line 314 with the assistance of pump 334. Line 314 meets line 336 at a T-joint whereby part of the mixture discharged from evaporator 316 through line 314 is recycled through line 314 back to evaporator 316 and part of the mixture enters line 336 which meets line 338 at a T-joint. Pump 340 forces the partially dehydrated and partially deoiled mixture through line 336 and ultimately line 338 to third stage or first effect 342 of the evaporator assembly. In the third stage evaporator a procedure is followed which is similar to that in the second stage except that the pressure is generally higher. The pressure in each succeeding evaporator stage is usually somewhat higher than in the preceding stage, approaching approximately atmospheric pressure in the third and last stage. The temperature of the product of third stage evaporator 342, i.e., a slurry of waste solids in fluidizing oil containing about 1 percent by weight of water based on the entire slurry and essentially none of the relatively light oil, is generally greater than that of the product of second stage evaporator 316 and is within the range of about 100°–400°F and preferably about 200°–350°F. The heating medium is steam at a temperature about 30°–50°F higher than that of the product, i.e., an essentially completely dehydrated slurry of waste solids in non-volatile fluidizing oil from which the light oil has been essentially completely removed. This steam is generated in a boiler-furnace any suitable and convenient design as shown in FIG. 4 and conveyed to third stage 342 of the evaporator through line 334. Condensate of the heating steam is withdrawn through line 346 and returned to the boiler-furnace.

The essentially anhydrous slurry of waste solids in oil withdrawn from third stage evaporator 342 is discharged by pump 348 through line 338. Line 338 meets line 350 at a T-joint whereby part of the slurry discharged from evaporator 342 through line 338 is recycled through line 338 back to evaporator 342 and part of the slurry enters line 350. Pump 356 forces the slurry through line 350 to continuous centrifuge 358. The relatively non-volatile fluidizing oil, and any relatively light oil that may be present, are separated from the waste solids in centrifuge 358 and conducted therefrom through line 360 to recycle oil tank 362. Recovered fluidizing oil, which may contain light oil, is discharged by pump 364 through line 306 to fluidizing tank 300 for recycling through the system. If the process provides a net yield of fluidizing oil and/or relatively light oil, it may be recovered from recycle oil tank 362 and stored for use outside the system.

The waste solids, having residual fluidizing oil and, optionally, light oil sorbed thereon, are discharged from centrifuge 358 and conducted through conduit 366 to repulping tank 368. Relatively light oil is conducted through line 370, which meets conduit 366 at a T-joint, and enters conduit 366 and ultimately repulping tank 368. The mixture of waste solids containing residual fluidizing oil and light oil in repulping tank 368 is agitated by means of stirring device 371 and the fluid mixture is then withdrawn from the repulping tank by means of pump 372. Pump 372 delivers the mixture through line 374 to continuous centrifuge 376. The light oil and extracted residual fluidizing oil are separated from the waste solids in centrifuge 376 and conducted therefrom through line 378 to holding tank 380. The light oil containing extracted fluidizing oil is discharged by pump 386 through line 304 to fluidizing tank 300 for recycling through the system.

Line 388 is connected by a T-joint at one end to line 304 and by a T-joint at its other end to line 350. When valve 390, which is located on line 304, is at least partially closed and valve 392, which is on line 388, is at least partially opened, at least a portion of the light oil and extracted fluidizing oil may be shunted from line 304 through line 388 to line 350 where it serves to reduce the viscosity of the esssentially completely dehydrated slurry of waste solids in non-volatile fluidizing oil being conducted therethrough from third stage evaporator 342 to continuous centrifuge 358. Thus, by adjusting valves 390 and 392, anywhere from none to all of the light oil and extracted fluidizing oil may be bypassed from line 304 to line 350. The setting of valves 390 and 392 determines how much, if any, light oil is present in recycle oil tank 362.

The water-insoluble waste solids, having residual light oil and no more than trace amounts of fluidizing oil sorbed thereon, are discharged from centrifuge 376 and conducted through conduit 394 to repulping tank 396. Water is conducted through line 398 to repulping tank 396. The mixture of waste solids containing residual light oil and water in repulping tank 396 is agitated by stirring device 400 and the fluid mixture is then withdrawn from the repulping tank by means of pump 402. Pump 402 delivers the mixture through line 404 which meets line 406 at a T-joint. The fluid mixture is conducted through line 406 to the evaporating region of first stage evaporator 330 of the overall three-stage evaporator assembly where the mixture is converted to a mixed vapor of steam and vaporized light oil. In evaporator 330 the residual light oil and part of the water are boiled off at a pressure which may typically be between about 2 and 10 inches Hg absolute. The temperature of the essentially completely deoiled and partially dehydrated product of the entering mixture of water and aqueous waste solids containing residual light oil is in the range of about 70°–250°F and preferably about 90°–175° F, depending on the pressure in the evaporator. The system is heated by a mixed vapor of steam and vaporized light oil from line or vapor duct 328 which is at a temperature about 30°–40°F higher than the temperature of the deoiled and partially dehydrated mixture of waste solids in water. As set forth earlier, condensate of the heating vapor is withdrawn through line 332. Water vapor and light oil vapor formed as a result of evaporation of the entering mixture of water and waste solids containing residual light oil are removed from the vapor chamber of evaporator 330 through line or vapor duct 408 into surface condenser 410 within which a partial vacuum is maintained by means of vacuum pump 416 which is connected to condenser 410 via vacuum line 418.

Surface condenser 410 is cooled by cooling water which enters the condenser through line 420 and leaves the condenser through line 422. The mixed vapor of steam and vaporized light oil entering condenser 410 through vapor duct 408 is condensed therein and the mixed condensate of water and light oil is discharged from the condenser through line 424 to scalping tank 326.

The essentially completely deoiled slurry of waste solids in water from evaporator 330 is continuously removed through line 406 with the assistance of pump 426. Line 406 meets line 428 at a T-joint whereby part of the mixture discharged from evaporator 330 through line 406 is recycled through line 406 back to evaporator 330 and part of the mixture enters line 428. Pump 430 forces the slurry of waste solids in water through line 428 to settling tank 432. The waste solids settle to the bottom of settling tank 432 from which they are removed as a water-wet mud through line 434 with the assistance of pump 436. Supernatant water is removed from the top of settling tank 432 through line 398 and is forced by pump 438 through line 398 to repulping tank 396 where the water is mixed with waste solids containing residual light oil and recycled through the system.

In scalping tank 326, clean water obtained as a product from the aqueous waste solids fed to the system is separated from the light oil with which it is associated in the scalping tank. The clean water is withdrawn from the scalping tank through line 440. The product clean water may be used within the system or it may be removed to storage for use outside the system. The light oil phase is removed from scalping tank 326 through line 370 and is urged by pump 442 through line 370 to conduit 366 and ultmately repulping tank 368 where it is mixed with waste solids containing residual fluidizing oil and recycled through the system.

FIG. 4 depicts a portion of the apparatus used in a modification of the apparatus of FIG. 1 wherein the deoiler apparatus is directly connected to a drying evaporator operating under reduced pressure. Accordingly, the deoiler apparatus is also under reduced pressure. The apparatus of FIG. 4 differs primarily from that of FIG. 1 in that line 150 does not contain a valve 159 equipped with a pressure sensor, and there is a first rotary valve or its equivalent between live bottom bin 136 and deoiler apparatus 138 and a second rotary valve or its equivalent between deoiler apparatus 138 and live bottom bin 152. The advantages of operating the deoiler apparatus under reduced pressure are that the deoiling process requires less blowing steam, and it may be carried out at lower temperatures which is advantageous when deoiling a temperature sensitive material such as a foodstuff or an animal feed.

In FIG. 4, the anhydrous slurry of waste solids in oil enters the first section of continuous centrifuge 118 via line 114 and the separated non-volatile fluidizing oil is conducted from said centrifuge through line 120. Light oil conducted through line 130 enters the screen bowl second section centrifuge 118 where it extracts residual fluidizing oil from the waste solids. Light oil and extracted fluidizing oil are conducted from the centrifuge through line 132. Light oil-laden waste solids from the discharge chute of centrifuge 118 enter live bottom bin 136. The live bottom of bin 136 causes the waste solids to advance to the exit thereof where they are conveyed by rotary valve 450 into deoiler apparatus 138. As in FIG. 1, deoiler apparatus 138 may, if desired, be externally heated by steam which enters steam jacket 140 through line 144. Condensate of the jacket steam is withdrawn through line 146. Blowing steam generated in a boiler-furnace 451 of any suitable and convenient design enters deoiler apparatus 138 via line 148 and comes into direct contact with the light oil-laden waste solids, thus causing vaporization of said light oil. The waste solids, free from residual light oil, are discharged from deoiler apparatus 138 by means of rotary valve 452 into live bottom bin 152. The waste solids, free from fluidizing oil and light oil as well as being essentially dry, are finally discharged from live bottom bin 152 via line 154.

Blowing steam and vaporized light oil exit from deoiler apparatus 138 through line 150. Line 150 is ultimately connected to an evaporator stage operating under reduced pressure whereby the energy of the blowing steam and the vaporized light oil are recovered as useful work by supplying heat to said evaporator stage. Because, as mentioned above, there is no valve equipped with a pressure sensor on line 150, deoiler apparatus 138 is in direct connection with the evaporator stage operating under reduced pressure. Since rotary valves 450 and 452 are essentially air tight, deoiler apparatus 138 is as a result under reduced pressure even though live bottom bins 136 and 152 to which it is connected are under essentially atmospheric pressure.

While the flow diagrams as shown in the drawings have been discussed above in connection with the dehydration and subsequent deoiling of aqueous waste solids, it will be understood by those skilled in the art that our invention is not limited thereto. Hence, the instant invention finds utility in the dehydration and deoiling of aqueous solids generally and may be used to advantage in the dehydration in an oil medium, followed by gross deoiling, of aqueous solids having intrinsic value. Examples of such solids are pharmaceutical products, animal feeds, and food products.

This invention will be further illustrated by the following specific examples.

EXAMPLE 1

A meat product in a non-volatile fluidizing oil was dehydrated by heat evaporation according to the practice of this invention. The anhydrous slurry was centrifuged to yield 150 pounds of dried meat product and residual oil in which the oil content was 44.0 weight percent. The meat product containing residual oil was slurried with 229 pounds of Isopar G, an isoparaffinic oil manufactured by Humble Oil and Refining Company. The slurry was heated to 200°F and agitated for 5 minutes. It was then slowly charged to a centrifuge where the liquid and the solid phases were separated. The liquid phase, consisting of Isopar G and extracted residual fluidizing oil, was returned to the evaporator system for the recovery and recycling of each component. The solid phase, including residual Isopar G, weighed 135 pounds.

A portion of the foregoing solid phase weighing 92 pounds was charged into a deoiler apparatus heated by a steam jacket and containing a heated screw. The pressure within said deoiler was maintained very slightly below atmospheric pressure. The solid material, agitated by the heated screw, was contacted within the deoiler apparatus with saturated blowing steam which aided in the ready evaporation of the Isopar G. The resultant dried meat product was a powder having an oil content of 14.26 percent by weight. The mixed steam/Isopar G vapor was conducted from the deoiler apparatus to the evaporator system for the recovery of the heat content thereof as useful work. The steam and the Isopar G vapor were ultimately condensed and recovered.

EXAMPLE 2

Example 1 was repeated using dried sewage sludge derived from the dehydration thereof in a non-volatile fluidizing oil by heat evaporation followed by centrifugation to yield 101 pounds of dried sewage sludge powder having a residual fluidizing oil content of 46.3 weight percent. The sludge containing residual oil was slurried with 132 pounds of Isopar G and the mixture agitated at 200°F for 5 minutes. The slurry was then slowly charged to a centrifuge where the liquid and solid phases were separated. The liquid phase, consisting of the Isopar G and extracted residual fluidizing oil, was returned to the evaporator system for the recovery and recycling of each component. The solid phase, including residual Isopar G, weighed 81.5 pounds.

A portion of the separated solid phase weighing 57.5 pounds was charged into a deoiler apparatus heated via a steam jacket and containing a heated screw. While maintaining the pressure within the deoiler very slightly below atmospheric pressure, the sewage sludge was agitated by the heated screw and simultaneously contacted with saturated blowing steam which facilitated the evaporation of the residual Isopar G. The dried sewage sludge thus obtained had an oil content of 11.9 percent by weight. As in Example 1, the heat content of the mixed steam/Isopar G vapor from the deoiler was recovered as useful work. The mixed vapor was ultimately condensed and the water and Isopar G recovered.

CONCLUSION

Thus, the instant invention provides process and apparatus for the recovery of residual oil from solids dehydrated in an oil medium and grossly deoiled. The process is characterized by the recovery of clean water from aqueous solids which are dehydrated in a fluidizing oil medium and grossly deoiled. Residual fluidizing oil is removed from the essentially dehydrated and grossly deoiled solids by extraction with a relatively volatile, low viscosity light oil that is immiscible with water. The light oil-laden solids are thereafter brought into direct contact with steam. The steam, if superheated, supplies latent heat for the evaporation of the light oil and, furthermore, since the light oil is water-immiscible, its direct contact with the steam amounts essentially to a steam distillation wherein the light oil in the presence of steam boils at a temperature below its normal boiling point. As a result, not only is the light oil more readily evaporated from the solids with less heat energy being required, but it makes possible the use of higher boiling relatively light oils. Furthermore, this invention makes possible the winning or recovery of solids that are not only dehydrated but which are de-oiled beyond the point usually attainable by mechanical means.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadest extent that the prior art allows.

We claim as our invention:

1. An apparatus for recovering clean water from water-insoluble aqueous solids, said apparatus comprising (1) a tank adapted to receive a stream of said aqueous solids and provided with a stirring or mixing mechanism, (2) a fluidizing oil reservoir, (3) a conduit for transmitting fluidizing oil from said oil reservoir to said tank wherein fluidizing oil and aqueous solids may be mixed, (4) a multi-stage evaporator comprising at least first and second stages, (5) a conduit extending from said tank to the second stage of said evaporator wherethrough may flow a stream of aqueous solids admixed with fluidizing oil from said tank into the evaporating region of said evaporator, (6) a vapor duct extending from the vapor chamber of said second evaporator stage to the evaporating region of the first evaporator stage through which may flow water vapor formed as a result of heat evaporation to thereby act as a source of evaporative heat in said first evaporator stage, (7) a first liquid-solid separating means, (8) a condudit extending from the final stage of said evaporator to said first liquid-solid separating means wherethrough may flow a stream of a substantially anhydrous slurry of water-insoluble solids in fluidizing oil, (9) a first repulping tank provided with a mixing or stirring device, (10) a conduit extending from said first liquid-solid separating means to said first repulping tank through which may flow solids containing residual fluidizing oil, (11) a source of a relatively light oil, (12) a conduit extending from said source of light oil to said first repulping tank wherethrough may flow light oil to be mixed with fluidizing oil-laden solids in said first repulping tank, (13) a second liquid-solid separating means, (14) a conduit extending from said first repulping tank to said second liquid-solid separating means wherethrough may flow a slurry of water-insoluble solids in light oil containing extracted residual fluidizing oil, (15) a second repulping tank provided with a mixing or stirring device, (16) a conduit extending from said second light-solid separating means to said second repulping tank through which may flow solids containing residual light oil, (17) a water reservoir, (18) a conduit extending from said water reservoir to said second repulping tank wherethrough may flow water to be admixed with light oil-laden solids in said second repulping tank, (19) a conduit extending from said second repulping tank to the first stage of the multi-stage evaporator wherethrough may flow a slurry of light oil-laden water-insoluble solids in water from said second repulping tank into the evaporating region of said first stage of the evaporator, (20) a condenser, (21) a conduit extending from said first stage of the evaporator to said condenser through which may flow water vapor and light oil vapor formed as a result of heating said slurry of light oil-laden solids in water, (22) a scalping tank, (23) means for withdrawing mixed water vapor condensate and light oil condensate from said condenser to said scalping tank wherein said mixed condensate is separated into a clean water product and light oil, (24) a settling tank, and (25) a conduit extending from said first evaportor stage to said settling tank wherethrough may flow a slurry of light oil-free water-insoluble solids in water from said first evaporator stage to said settling tank wherein said slurry is separated into wet solids and supernatant water.

2. The apparatus of claim 1 wherein said second stage of the multi-stage evaporator is itself a multi-stage evaporator and wherein all stages of the evaporator system are adapted to have fluid material to be heated and evaporated therein and vaporous material to effect this heating and evaporating flow through it countercurrently.

3. The apparatus of claim 1 wherein each of said liquid-solid separating means is a continuous centrifuge.

4. The apparatus of claim 1 wherein the source (11) of relatively light oil is said scalping tank (22).

5. the apparatus of claim 1 wherein the water reservoir (17) is said settling tank (24).

6. A process for the recovery of residual oil from water-insoluble solids dehydrated in an oil medium and thereafter grossly deoiled comprising the steps of (1) admixing aqueous solids with a relatively non-volatile oil to obtain a mixture which will remain fluid and pumpable after the removal of the water content therefrom; (2) subjecting the resultant oil-containing mixture to dehydration by heat evaporation to yield water vapor and a substantially anhydrous solids in oil slurry; (3) condensing said water vapor and recovering the resulting condensate as a clean water product; (4) separating the gross part of the relatively non-volatile oil from said solids in oil slurry; (5) slurrying the resultant oil-laden solids with a relatively low viscosity, relatively volatile light oil that is water-immiscible; (6) separating said light oil and extracted residual non-volatile oil from said solids: (7) slurrying the resultant light oil-laden solids with water; (8) bringing the resultant aqueous slurry into indirect thermal contact with steam and thereby removing a portion of the water and substantially all of the light oil from said aqueous slurry by heat evaporation; (9) allowing the solids in the resultant slurry of solids and excess water to settle under the force of gravity, and (10) removing the supernatant water from the settled solids.

7. The process of claim 6 wherein heat evaporation step (2) is carried out at temperaturs within the range of about 100°F to 400°F and heat evaporation step (8) is carried out at temperatures within the range of about 70°F to 250°F.

* * * * *

UNITED STATES PATENT AND TRADEMARK OFFICE
CERTIFICATE OF CORRECTION

PATENT NO. : 3,855,079    Page 1 of 3

DATED : December 17, 1974

INVENTOR(S) : Charles Greenfield et al.

It is certified that error appears in the above—identified patent and that said Letters Patent is hereby corrected as shown below:

Column 4, line 34, for "wall" read --well--;

line 43, for "oil" read --oils--;

line 56, for "apppreciable" read --appreciable--;

line 57, for "adeded" read --added--.

Column 5, line 29, for "separating" read --separated--.

Column 7, line 24, between "gives" and "fluid" insert --a--.

Column 8, line 18, for "recompresion" read --recompression--;

line 63, for "pressure" read --pressures--.

Column 10, line 22, for "parts" read --part--.

Column 13, line 33, for "that" read --than--;

line 55, for "fluidiing read --fluidizing--.

UNITED STATES PATENT AND TRADEMARK OFFICE
CERTIFICATE OF CORRECTION

PATENT NO. : 3,855,079
DATED : December 17, 1974
INVENTOR(S) : Charles Greenfield et al.

It is certified that error appears in the above—identified patent and that said Letters Patent is hereby corrected as shown below:

Column 15, line 35, for "conveyer" read --conveyor--;

line 49, for "conveyer" read --conveyor-;

line 60, for "conveyer" read --conveyor--.

Column 17, line 61, for "esssentially" read --essentially--.

Column 19, line 7, for "ultmately" read --ultimately--.

Column 20, line 21, for "the" (first word in the line) read --The--.

UNITED STATES PATENT AND TRADEMARK OFFICE
CERTIFICATE OF CORRECTION

PATENT NO. : 3,855,079       Page 3 of 3

DATED : December 17, 1974

INVENTOR(S) : Charles Greenfield et al.

It is certified that error appears in the above—identified patent and that said Letters Patent is hereby corrected as shown below:

line 64 (claim 1, line 19), for "condudit" read --conduit--.

Column 24, line 5 (claim 7, line 2), for "temperaturs" read --temperatures--.

Signed and Sealed this

Twenty-seventh Day of December 1983

[SEAL]

Attest:

GERALD J. MOSSINGHOFF

Attesting Officer      Commissioner of Patents and Trademarks